US008713259B2

(12) United States Patent
Bryant

(10) Patent No.: US 8,713,259 B2
(45) Date of Patent: Apr. 29, 2014

(54) METHOD AND APPARATUS FOR REACQUIRING LINES IN A CACHE

(75) Inventor: Christoper D. Bryant, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 342 days.

(21) Appl. No.: 12/948,562

(22) Filed: Nov. 17, 2010

(65) Prior Publication Data

US 2012/0124296 A1   May 17, 2012

(51) Int. Cl.
*G06F 12/12*   (2006.01)

(52) U.S. Cl.
USPC ............... 711/133; 711/136; 711/E12.022; 711/E12.001

(58) Field of Classification Search
None
See application file for complete search history.

(56) References Cited

U.S. PATENT DOCUMENTS

| | | | |
|---|---|---|---|
| 5,265,233 A * | 11/1993 | Frailong et al. | 711/118 |
| 7,376,800 B1 * | 5/2008 | Choquette et al. | 711/147 |
| 2003/0204668 A1 * | 10/2003 | Wilcox et al. | 711/105 |
| 2004/0083341 A1 * | 4/2004 | Robinson et al. | 711/133 |
| 2004/0163082 A1 * | 8/2004 | Tremblay et al. | 718/101 |
| 2006/0190498 A1 * | 8/2006 | Pruet | 707/202 |
| 2006/0294326 A1 * | 12/2006 | Jacobson et al. | 711/156 |
| 2011/0138126 A1 * | 6/2011 | Blundell et al. | 711/125 |
| 2011/0161597 A1 * | 6/2011 | Tremaine et al. | 711/133 |

* cited by examiner

*Primary Examiner* — Michael Krofcheck

(57) ABSTRACT

A method and apparatus for controlling re-acquiring lines of memory in a cache is provided. The method comprises storing at least one atomic instruction in a queue in response to the atomic instruction being retired, and identifying a target memory location associated with load and store portions of the atomic instruction. A line of memory associated with the target memory location is acquired and stored in a cache. Subsequently, if the line of acquired memory is evicted, then it is re-acquired in response to the atomic instruction becoming the oldest instruction stored in the queue. The apparatus comprises a queue and a cache. The queue is adapted for storing at least one atomic instruction in response to the atomic instruction being retired. A target memory location is associated with load and store portions of the atomic instruction. The cache is adapted for acquiring a line of memory associated with the target memory location, storing the line of acquired memory in a cache, evicting the acquired line of memory from the cache in response to detecting a conflict regarding the acquired line of memory, and re-acquiring the line of memory in response to the atomic instruction becoming the oldest instruction stored in the queue.

29 Claims, 4 Drawing Sheets

METHOD AND APPARATUS FOR REACQUIRING LINES IN A CACHE

BACKGROUND

1. Field of the Invention

Embodiments of this invention relate generally to computers, and, more particularly, to the processing and maintenance of a cache.

2. Description of Related Art

Processors generally use memory operations to move data to and from memory. The term "memory operation" refers to an operation that specifies a transfer of data between a processor and memory (or cache). Load memory operations specify a transfer of data memory to the processor, and store memory operations specify a transfer of data from the processor to memory.

In some processors, store memory operations are not required to occur immediately upon a store instruction being completed or retired. That is, a load/store unit within the processor maintains a queue of retired instructions that are handled as resources become available. It is desirable that these retired store instructions will eventually store their data within a corresponding cache entry, as opposed to main memory, for the sake of speed. Thus, each of these retired store instructions is permitted to initiate a request that the corresponding line of memory be retrieved and stored in the cache in preparation of the data being stored therein.

However, since there may be numerous retired store operations simultaneously present in the queue, each requesting a line of memory for the cache, conflicts may arise. For example, a line of memory in the cache that was requested by store operation A may be evicted from the cache when store operation B requests a conflicting line of memory. Store operation A then seeks to reacquire the line of memory that it needs, causing the line of memory requested by store operation B to be evicted from the cache. The process continues unabated until the conflict is removed by completing one of the store operations, A or B. The intervening thrashing of the cache; however, is inefficient, wasting the resources and power of the processor.

SUMMARY OF EMBODIMENTS OF THE INVENTION

In one aspect of the present invention, a method is provided. The method comprises storing at least one atomic instruction in a queue in response to the atomic instruction being retired, and identifying a target memory location associated with load and store portions of the atomic instruction. A line of memory associated with the target memory location is acquired and stored in a cache. Subsequently, if the line of acquired memory is evicted, then it is re-acquired in response to the atomic instruction becoming the oldest instruction stored in the queue.

In another aspect of the present invention, an apparatus is provided. The apparatus comprises a queue and a cache. The queue is adapted for storing at least one atomic instruction in response to the atomic instruction being retired. A target memory location is associated with load and store portions of the atomic instruction. The cache is adapted for acquiring a line of memory associated with the target memory location, storing the line of acquired memory in a cache, and if the line of acquired memory has been evicted, re-acquiring the line of memory in response to the atomic instruction becoming the oldest instruction stored in the queue.

In yet another aspect of the present invention, a computer readable program storage device encoded with at least one instruction that, when executed by a computer, performs a method is provided. The method comprises storing at least one atomic instruction in a queue in response to the atomic instruction being retired, and identifying a target memory location associated with load and store portions of the atomic instruction. A line of memory associated with the target memory location is acquired and stored in a cache. Subsequently, if the line of acquired memory is evicted, then it is re-acquired in response to the atomic instruction becoming the oldest instruction stored in the queue.

In still another aspect of the present invention, a computer readable storage device encoded with data that, when implemented in a manufacturing facility, adapts the manufacturing facility to create an apparatus is provided. The apparatus comprises a queue and a cache. The queue is adapted for storing at least one atomic instruction in response to the atomic instruction being retired. A target memory location is associated with load and store portions of the atomic instruction. The cache is adapted for acquiring a line of memory associated with the target memory location, storing the line of acquired memory in a cache, and if the line of acquired memory has been evicted, re-acquiring the line of memory in response to the atomic instruction becoming the oldest instruction stored in the queue.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
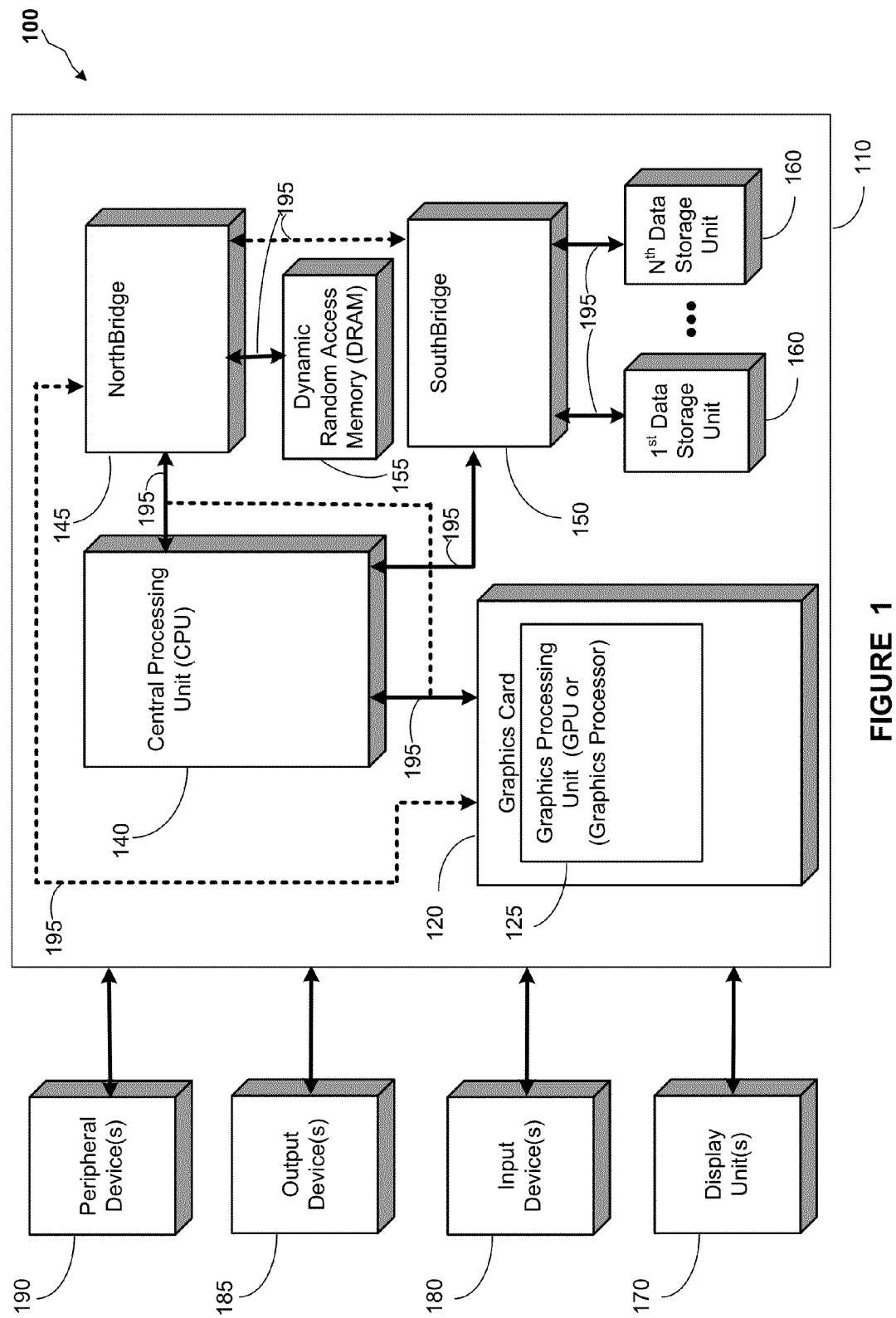
FIG. 1 schematically illustrates a simplified block diagram of a computer system according to one embodiment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

The present invention will now be described with reference to the attached figures. Various structures, connections, systems and devices are schematically depicted in the drawings for purposes of explanation only and so as to not obscure the disclosed subject matter with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Turning now to FIG. 1, a block diagram of an exemplary computer system 100, in accordance with an embodiment of the present invention, is illustrated. In various embodiments, the computer system 100 may be a personal computer, a laptop computer, a handheld computer, a netbook computer, a mobile device, a telephone, a personal data assistant (PDA), a server, a mainframe, a work terminal, or the like. The computer system includes a main structure 110, which may be a computer motherboard, system-on-a-chip, circuit board or printed circuit board, a desktop computer enclosure and/or tower, a laptop computer base, a server enclosure, part of a mobile device, personal data assistant (PDA), or the like. In one embodiment, the main structure 110 includes a graphics card 120. In one embodiment, the graphics card 120 may be an ATI Radeon™ graphics card from Advanced Micro Devices ("AMD") or any other graphics card using memory, in alternate embodiments. The graphics card 120 may, in different embodiments, be connected on a Peripheral Component Interconnect (PCI) Bus (not shown), PCI-Express Bus (not shown) an Accelerated Graphics Port (AGP) Bus (also not shown), or any other connection known in the art. It should be noted that embodiments of the present invention are not limited by the connectivity of the graphics card 120 to the main computer structure 110. In one embodiment, the computer system 100 runs an operating system such as Linux, Unix, Windows, Mac OS, or the like.

In one embodiment, the graphics card 120 may contain a graphics processing unit (GPU) 125 used in processing graphics data. In various embodiments the graphics card 120 may be referred to as a circuit board or a printed circuit board or a daughter card or the like.

In one embodiment, the computer system 100 includes a central processing unit (CPU) 140, which is connected to a northbridge 145. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other connection as is known in the art. For example, the CPU 140, the northbridge 145, and the GPU 125 may be included in a single package or as part of a single die or "chips". Alternative embodiments, which may alter the arrangement of various components illustrated as forming part of main structure 110, are also contemplated. In certain embodiments, the northbridge 145 may be coupled to a system RAM (or DRAM) 155; in other embodiments, the system RAM 155 may be coupled directly to the CPU 140. The system RAM 155 may be of any RAM type known in the art; the type of RAM 155 does not limit the embodiments of the present invention. In one embodiment, the northbridge 145 may be connected to a southbridge 150. In other embodiments, the northbridge 145 and southbridge 150 may be on the same chip in the computer system 100, or the northbridge 145 and southbridge 150 may be on different chips. In various embodiments, the southbridge 150 may be connected to one or more data storage units 160. The data storage units 160 may be hard drives, solid state drives, magnetic tape, or any other writable media used for storing data. In various embodiments, the central processing unit 140, northbridge 145, southbridge 150, graphics processing unit 125, and/or DRAM 155 may be a computer chip or a silicon-based computer chip, or may be part of a computer chip or a silicon-based computer chip. In one or more embodiments, the various components of the computer system 100 may be operatively, electrically and/or physically connected or linked with a bus 195 or more than one bus 195.

In different embodiments, the computer system 100 may be connected to one or more display units 170, input devices 180, output devices 185, and/or peripheral devices 190. It is contemplated that in various embodiments, these elements may be internal or external to the computer system 100, and may be wired or wirelessly connected, without affecting the scope of the embodiments of the present invention. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier or other output device. The peripheral devices 190 may be any other device which can be coupled to a computer: a CD/DVD drive capable of reading and/or writing to physical digital media, a USB device, Zip Drive, external floppy drive, external hard drive, phone and/or broadband modem, router/gateway, access point and/or the like. To the extent certain exemplary aspects of the computer system 100 are not described herein, such exemplary aspects may or may not be included in various embodiments without limiting the spirit and scope of the embodiments of the present invention as would be understood by one of skill in the art.

Figure 2:
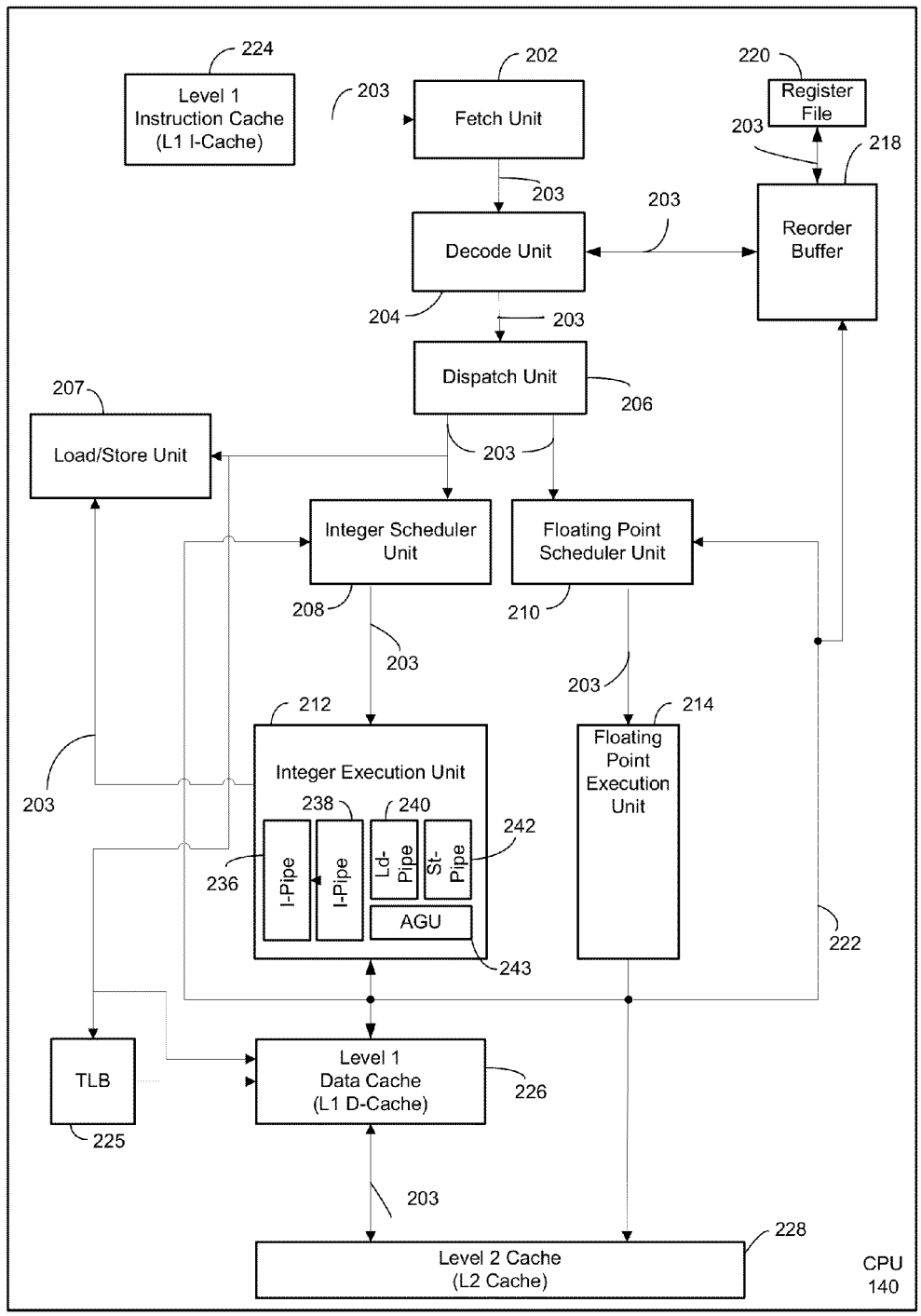
FIG. 2 illustrates an exemplary detailed representation of one embodiment of the central processing unit provided in FIG. 1 according to one embodiment.

Turning now to FIG. 2, a diagram of an exemplary implementation of the CPU 140, in accordance with an embodiment of the present invention, is illustrated. The CPU 140 includes a fetch unit 202, a decode unit 204, a dispatch unit 206, a load/store unit 207, an integer scheduler unit 208 a floating-point scheduler unit 210, an integer execution unit 212, a floating-point execution unit 214, a reorder buffer 218, and a register file 220. In one or more embodiments, the various components of the CPU 140 may be operatively, electrically and/or physically connected or linked with a bus 203 or more than one bus 203. The CPU 140 may also include a result bus 222, which couples the integer execution unit 212 and the floating-point execution unit 214 with the reorder buffer 218, the integer scheduler unit 208, and the floating-point execution unit 210. Results that are delivered to the result bus 222 by the execution units 212, 214 may be used as operand values for subsequently issued instructions and/or values stored in the reorder buffer 218. The CPU 140 may also include a Level 1 Instruction Cache (LI I-Cache) 224 for storing instructions, a Level 1 Data Cache (L1 D-Cache 226) for storing data and a Level 2 Cache (L2 Cache) 228 for storing data and instructions. As shown, in one embodiment, the L1 D-Cache 226 may be coupled to the integer execution unit 212 via the result bus 222, thereby enabling the integer execution unit 212 to request data from the L1 D-Cache 226. In some cases, the integer execution unit 212 may request data not contained in the L1 D-Cache 226. Where requested data is not located in the L1 D-Cache 226, the requested data may be retrieved from a higher-level cache (such as the L2 cache 228) or memory 155 (shown in FIG. 1). In another embodiment, the L1 D-cache 226 may also be coupled to the floating-point execution unit 214. In this case, the integer execution unit 212 and the floating-point execution unit 214 may share a unified L1 D-Cache 226. In another embodiment, the floating-point execution unit 214 may be coupled to its own respective L1 D-Cache. As shown, in one embodiment, the integer execution unit 212 and the floating-point execution unit 214 may be coupled to and share an L2 cache 228. In another embodiment, the integer execution unit 212 and the floating-point execution unit 224 may be each coupled to its own respective L2 cache. In one embodiment, the L2 cache 228 may provide data to the L1 I-Cache 224 and L1 D-Cache 226. In another embodiment, the L2 cache 228 may also provide instruction data to the L1 I-Cache 224. In different embodiments, the L1 I-Cache 224, L1 D-Cache 226, and the L2 cache 228 may be may be implemented in a fully-associated, set-associative, or direct mapped configuration. In one embodiment, the L2 Cache 228 may be larger than the L1 I-Cache 224 or the L1 D-Cache 226. In alternate embodiments, the L1 I-Cache 224, the L1 D-Cache 226 and/or the L2 cache 228 may be separate from or external to the CPU 140 (e.g., located on the motherboard). It should be noted that embodiments of the present invention are not limited by the sizes and configuration of the L1 I-Cache 224, the L1 D-Cache 226, and the L2 cache 228.

Referring still to FIG. 2, the CPU 140 may support out-of-order instruction execution. Accordingly, the reorder buffer 218 may be used to maintain the original program sequence for register read and write operations, to implement register renaming, and to allow for speculative instruction execution and branch misprediction recovery. The reorder buffer 218 may be implemented in a first-in-first-out (FIFO) configuration in which operations move to the bottom of the reorder buffer 218 as they are validated, making room for new entries at the top of the reorder buffer 218. The reorder buffer 218 may retire an instruction once an operation completes execution and any data or control speculation performed on any operations, up to and including that operation in program order, is verified.

Referring still to FIG. 2, the fetch unit 202 may be coupled to the L1 I-cache 224 (or a higher memory subsystem, such as the L2 cache 228 or external memory 155 (shown in FIG. 1)). The fetch unit 202 may fetch instructions from the L1 I-Cache for the CPU 140 to process. The fetch unit 202 may contain a program counter, which holds the address in the L1 I-Cache 224 (or higher memory subsystem) of the next instruction to be executed by the CPU 140. In one embodiment, the instructions fetched from the L1 I-cache 224 may be complex instruction set computing (CISC) instructions selected from a complex instruction set, such as the x86 instruction set implemented by processors conforming to the x86 processor architecture. Once the instruction has been fetched, the instruction may be forwarded to the decode unit 204.

The decode unit 204 may decode the instruction and determine the opcode of the instruction, the source and destination operands for the instruction, and a displacement value (if the instruction is a load or store) specified by the encoding of the instruction. The source and destination operands may be values in registers or in memory locations. A source operand may also be a constant value specified by immediate data specified in the instruction encoding. Values for source operands located in registers may be requested by the decode unit 204 from the reorder buffer 218. The reorder buffer 218 may respond to the request by providing either the value of the register operand or an operand tag corresponding to the register operand for each source operand. The reorder buffer 218 may also provide the decode unit 204 with a result tag associated with the destination operand of the instruction if the destination operand is a value to be stored in a register. In this case, the reorder buffer 218 may also store the result tag within a storage location reserved for the destination register within the future file 230. As instructions are completed by the execution units 212, 214, each of the execution units 212, 214 may broadcast the result of the instruction and the result tag associated with the result on the result bus 203. When each of the execution units 212, 214 produces the result and drives the result and the associated result tag on the result bus 222, the reorder buffer 218 may determine if the result tag matches any tags stored within. If a match occurs, the reorder buffer 218 may store the result within the storage location allocated to the appropriate register.

After the decode unit 204 decodes the instruction, the decode unit 204 may forward the instruction to the dispatch unit 206. The dispatch unit 206 may determine if an instruction is forwarded to either the integer scheduler unit 208 or the floating-point scheduler unit 210. For example, if an opcode for an instruction indicates that the instruction is an integer-based operation, the dispatch unit 206 may forward the instruction to the integer scheduler unit 208. Conversely, if the opcode indicates that the instruction is a floating-point operation, the dispatch unit 206 may forward the instruction to the floating-point scheduler unit 210.

In one embodiment, the dispatch unit 206 may also forward load instructions ("loads") and store instructions ("stores") to the load/store unit 207. The load/store unit 207 may store the loads and stores in various queues and buffers to facilitate in maintaining the order of memory operations by keeping in-flight memory operations (i.e., operations which have completed but have not yet retired) in program order. The load/store unit 207 may also maintain a queue (e.g., a retired store queue (RSQ) 304, shown in FIG. 3 and discussed in greater detail below) that maintains a listing of all stores that have been retired by the ROB 218, but have not yet been written to memory, such as the L1 D-Cache 226.

Once an instruction is ready for execution, the instruction is forwarded from the appropriate scheduler unit 208, 210 to the appropriate execution unit 212, 214. Instructions from the integer scheduler unit 208 are forwarded to the integer execution unit 212. In one embodiment, integer execution unit 212 includes two integer execution pipelines 236, 238, a load execution pipeline 240 and a store execution pipeline 242, although alternate embodiments may add to or subtract from the set of integer execution pipelines and the load and store execution pipelines. Arithmetic and logical instructions may be forwarded to either one of the two integer execution pipelines 236, 238, where the instructions are executed and the results of the arithmetic or logical operation are broadcast to the reorder buffer 218 and the scheduler units 208, 210 via the result bus 222. Memory instructions, such as loads and stores, may be forwarded, respectively, to the load execution pipeline 240 and store execution pipeline 242, where the address for the load or store is generated. The load execution pipeline 240 and the store execution pipeline 242 may each include an address generation unit (AGU) 243, which generates the linear address for its respective load or store. Each AGU 243 may generate a linear address for its respective load or store. Once the linear address is generated, the L1 D-Cache 226 may be accessed to either write the data for a store or read the data for a load (assuming the load or store hits in the L1 D-Cache 226) under control from the LSU 207, and more specifically the RSQ 304, as discussed below. In one embodiment, the L1 D-Cache 226, the L2 cache 228 or the memory 155 may be accessed using a physical address. Therefore, the CPU 140 may also include a translation lookaside buffer (TLB) 225 to translate virtual addresses into physical addresses.

Figure 3:
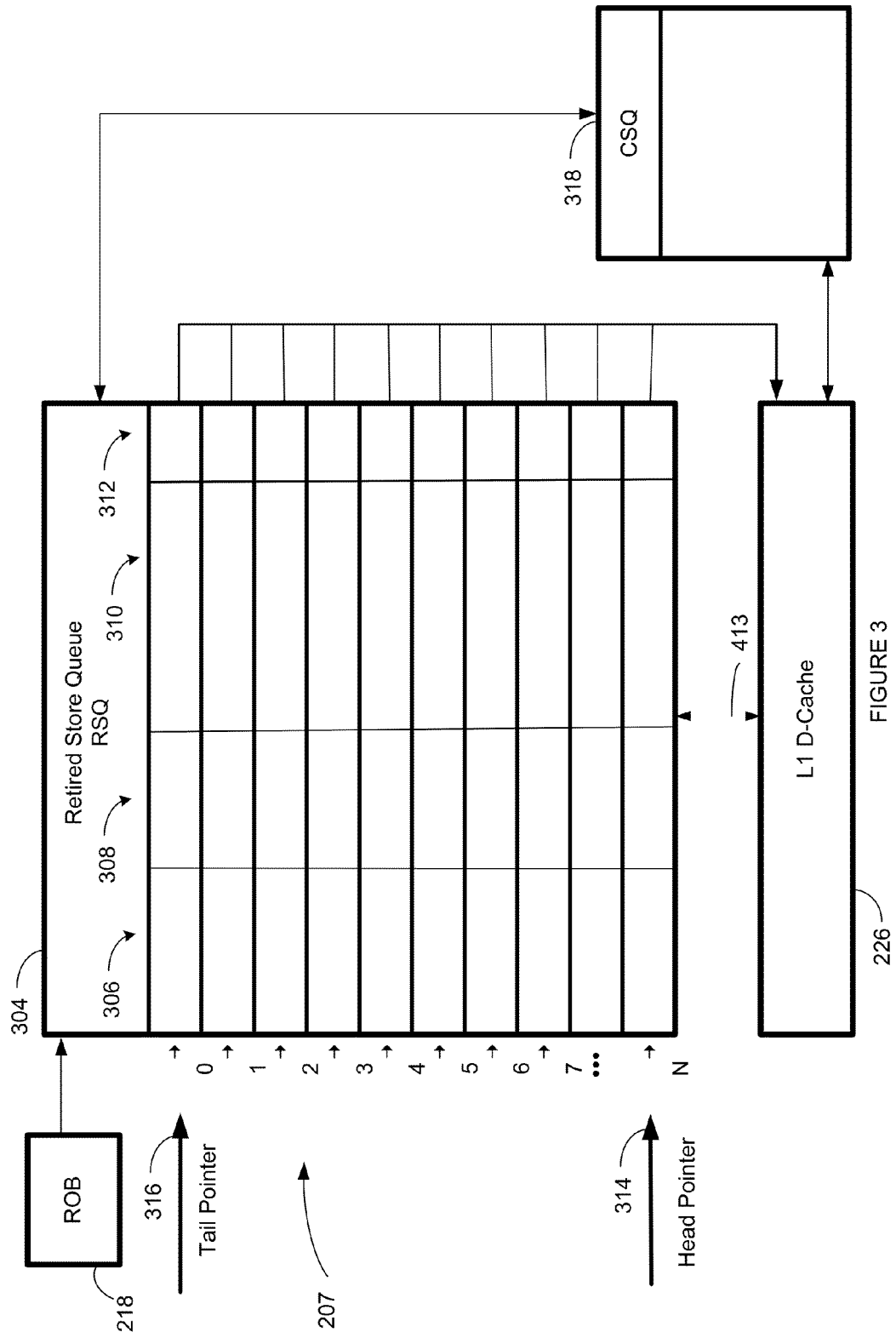
FIG. 3 illustrates an exemplary detailed representation of one embodiment of a load/store unit that includes a retirement store queue and a completed store queue coupled to a data cache according to one embodiment of the present invention.

Turning now to FIG. 3, a block diagram of the load/store unit 207 coupled with the L1 D-Cache 326, in accordance with an embodiment of the present invention, is illustrated. As shown, the load/store unit 207 includes the RSQ 304 and a completed store queue (CSQ) 318. The CSQ 318 maintains a list of store instructions that have been "completed." The RSQ 304 maintains an ordered list of store instructions that have been "retired." A store instruction becomes "completed" when the AGU 243 generates the address for the store, and the store hits in the TLB 225. In contrast thereto, a store instruction becomes "retired" when execution by the store execution pipeline 242 has completed with respect to that store instruction, but the results are still waiting to be written to memory, such as the L1 D-Cache 226. Thus, a store instruction may only be "retired" after it has first been "completed." A store instruction is placed in the CSQ 318 when the store instruction is completed. Thereafter, the store instruction is placed in the RSQ 304 when the instruction is retired. Finally, the store instruction is removed from the RSQ 304 when the store instruction is written to memory.

Information regarding the retirement of each store instruction may be obtained from the integer execution unit 212, the store execution pipeline 242, the AGU 243, the floating point execution unit 214 or the ROB 218 (shown in FIG. 3) and stored in the RSQ 304. The information may include the data 306 to be stored, the address 308 at which the data 306 is to be stored, certain flags 310, and a counter 312 that assists in reducing thrashing of the L1 D-Cache 226.

The RSQ 304 and the CSQ 318 may be organized using any of a variety of methodologies. For example, in one embodiment, the RSQ 304 and CSQ 318 may be arranged as ordered arrays of 0 to N storage entries. The RSQ 304 may be implemented in a FIFO configuration that contains a head and tail pointer 314, 316 to respectively identify the oldest and youngest entries in the RSQ 304. Each new store instruction is loaded into the RSQ 304 at the location identified by a tail pointer 316. Thereafter, the tail pointer 316 is incremented to identify the next location at which a store instruction will be loaded into the RSQ 304. The store instructions may remain in RSQ 304 until they are written to memory. Once a store instruction is written to memory, the head pointer 314 is incremented to identify the next oldest store instruction in the RSQ 304, effectively removing the now written store instruction from the RSQ 304 and identifying the newly oldest store instruction.

The CSQ 318 is organized in a similar manner, but since the operations received from the AGU 334 are non-ordered, it is useful to organize the CSQ 318 with tags that correlate to entries in the ROB 218 and RSQ 304. Thus, the tags contained in the ROB 218 and the CSQ 318 may be compared to determine which store instruction in the CSQ 318 is to be retired.

Accordingly, when the AGU 243 generates the address for the store instruction, and the load/store unit 207 selects the instruction, the address is forwarded to the L1 D-Cache 226 to check if the corresponding line of memory contained therein is valid. At this point, the store is "completed" and thus is stored in the CSQ 318. This "completed" status is communicated to the ROB 218, which will allow the store to be retired. Once retired, the store instruction is placed in the RSQ 304.

The flags 310 in the RSQ 304 may include an eviction field, which stores an eviction bit. The eviction bit may be set after a store instruction has been retired if a cache line for that store instruction (which was initially detected as a hit in the L1 D-Cache 226) is evicted to store a different cache line provided in a cache fill operation or a cache replacement algorithm. Because the L1 D-Cache 226 is accessed from a plurality of locations (such as other store instructions in the RSQ 304), it is possible that the line of data required by a particular store instruction will be evicted from the L1 D-Cache 226. In response to the line being evicted (and the eviction bit being set), the RSQ 304 will initiate an attempt to reacquire the desired line of data into the L1 D-Cache 226. The L1 D-Cache 226 will act to re-acquire the desired line of memory and will increment the counter 312.

To prevent undesirable thrashing of the L1 D-Cache 226, the number of reacquisitions for a particular store instruction is limited. That is, once the counter 312 exceeds a preselected number, further reacquisition attempts by that particular store instruction will not be allowed until that particular store instruction becomes the oldest store instruction in the RSQ 304. Because the store instructions are completed in order, a particular store instruction is not ready to store its data in the L1 D-Cache 226 until it is the oldest store instruction in the RSQ 304. Thus, continuing to re-acquire and then re-evict the same line of memory from the L1 D-Cache 226 wastes the cache and memory resources, causing the CPU 140 to consume unnecessary power.

Figure 4:
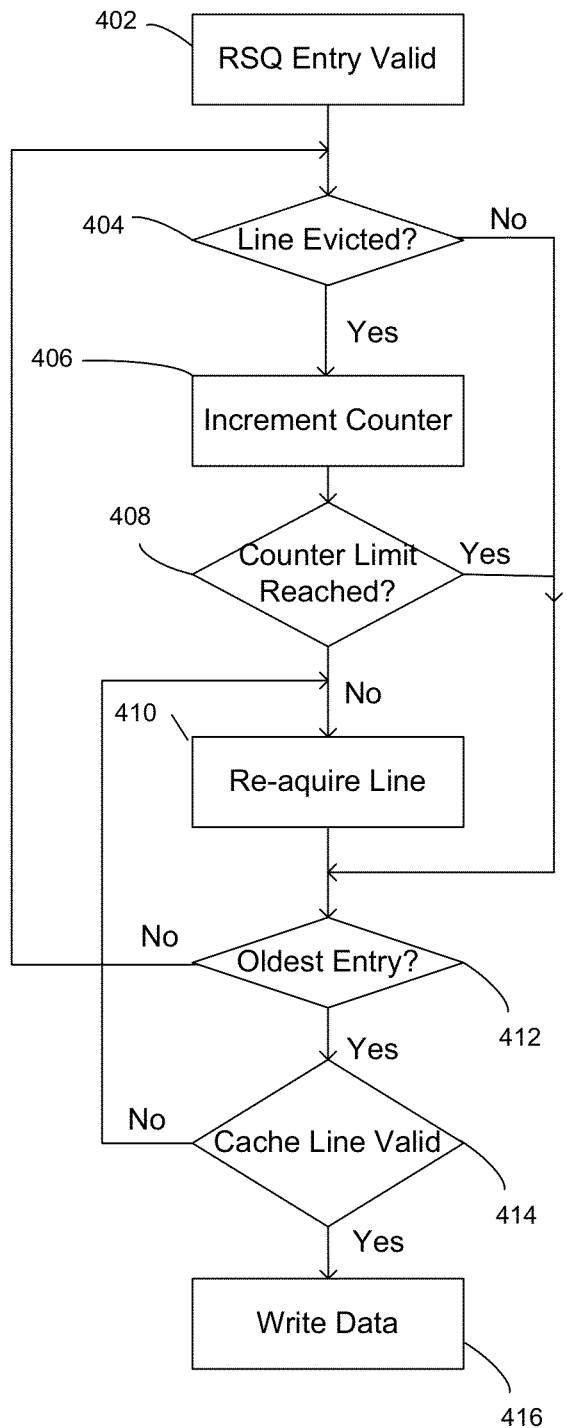
FIG. 4 illustrates a flowchart for operations of a retirement store queue in the load/store unit according to one embodiment of the present invention.

Turning now to FIG. 4, in accordance with one or more embodiments of the invention, a flowchart illustrating operations of the load/store unit 307 with respect to the RSQ 304 is shown. The operations begin at block 402, where a store instruction is examined to ensure that the entry is valid in the RSQ 304. At block 404, the RSQ 304 examines the eviction bit to determine if the desired line of memory has been evicted from the L1 D-Cache 226. If the line of memory has been evicted, the RSQ 304 at block 406 increments the counter 312 associated with the store instruction in the RSQ 304 that has been evicted. Thereafter, at block 408, the RSQ 304 checks the counter 312 to determine if a counter limit has been reached. If the counter limit has been reached, then the RSQ 304 assumes that undesirable thrashing of the L1 D-Cache 226 is occurring, as evidenced by a preset number of evictions having occurred, and thus, further reacquisitions are not permitted until the corresponding store instruction is the oldest store instruction in the RSQ 304. If the counter limit has not been reached, then at block 410 the line of memory is reacquired by the L1 D-Cache 226.

Those skilled in the art will appreciate that a variety of techniques may be used to determine whether a particular store instruction is the "oldest" instruction. For example, in the embodiment described above, one effective procedure for identifying the "oldest" instruction is to use the head pointer 314 in the RSQ 304 to identify the "oldest" instruction. However, it is envisioned that other methodologies may be used to identify the "oldest" store instruction, such as by using a timer or time code, without departing from the spirit and scope of the invention. Further, other contention-like algorithms could be applied to effectively redefine the "age" of various store instructions within the RSQ 304. For example, a contention algorithm could be used to select and move an instruction that is identified as being involved in thrashing the L1 D-Cache 226 to another "later" location in the RSQ 304, such that the moved instruction now appears to be "older," or in some cases, even the "oldest" instruction, once that store instruction is completed and the data is ready to be written to the L1 D-Cache 226. By redefining a store instruction to be the "oldest" in the RSQ 304, the corresponding line of memory will be reacquired by the L1 D-Cache 226, and the newly "oldest" instruction will write its data into the L1 D-Cache 326 without interruption from a younger store instruction. Additionally, in one embodiment of the instant invention, it is envisioned that the atomic instruction may be permitted to reacquire the line of memory into the L1 D-Cache 226 is data associated with the store instruction is ready to be written. One methodology for determining when this occurs is to wait until the atomic instruction becomes the oldest instruction in the RSQ 304; however it is envisioned that various other contention-like algorithms could be applied to select an atomic instruction that is ready to write its associated data to the L1-D-Cache 226 without that particular atomic instruction being the "oldest" store instruction in the RSQ 304.

At block 412, the RSQ 304 determines if the store instruction being examined is the oldest entry in the RSQ 304, which will be an indication of whether the store instruction is ready to be written to the L1 D-Cache 226. If the store instruction is not the oldest entry, then control transfers back to block 404 where the process repeats. Once the counter limit has been reached, further incrementing of the counter 312 at block 406 by subsequent transitions therethrough will nevertheless result in the counter limit being detected as reached at block 408, causing block 410 to be skipped so that continued reacquisitions of the line of memory are avoided.

Once the store instruction is the oldest store instruction in the RSQ 304, the block 412 will pass control to block 414 to attempt to write the data in the RSQ 304 to the L1 D-Cache 226. The first step in the writing process is to check to see if the desired line of data is in the L1 D-Cache 226 by examining the valid bit. Those skilled in the art will appreciate that while the desired line of memory may be re-acquired in block 410, that line of memory may again be evicted from the L1 D-Cache 226 before the write operation goes forward. Thus, if the line of memory is not valid, control is transferred back to block 410 so that the line of memory can be reacquired by the L1 D-Cache 226. Because the store instruction is the oldest store instruction in the RSQ 304 and is ready to be written to the L1 D-Cache 226, the RSQ 304 allows the line of memory to be re-acquired as many times as necessary for the write operation to finally occur at block 416. That is, since the store instruction is now ready to be written, thrashing the L1 D-Cache 226 is secondary to actually writing the data into the L1 D-Cache 226.

It is also contemplated that, in some embodiments, different kinds of hardware descriptive languages (HDL) may be used in the process of designing and manufacturing very large scale integration circuits (VLSI circuits) such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units 160, RAMs 130 & 155, compact discs, DVDs, solid state storage and the like). In one embodiment, the GDSII data (or other similar data) may be adapted to configure a manufacturing facility (e.g., through the use of mask works) to create devices capable of embodying various aspects of the instant invention. In other words, in various embodiments, this GDSII data (or other similar data) may be programmed into a computer 100, processor 125/140 or controller, which may then control, in whole or part, the operation of a semiconductor manufacturing facility (or fab) to create semiconductor products and devices. For example, in one embodiment, silicon wafers containing an RSQ 304 may be created using the GDSII data (or other similar data).

It should also be noted that while various embodiments may be described in terms of memory storage for graphics processing, it is contemplated that the embodiments described herein may have a wide range of applicability, not just for graphics processes, as would be apparent to one of skill in the art having the benefit of this disclosure.

The particular embodiments disclosed above are illustrative only, as the invention may be modified and practiced in different but equivalent manners apparent to those skilled in the art having the benefit of the teachings herein. Furthermore, no limitations are intended to the details of construction or design as shown herein, other than as described in the claims below. It is therefore evident that the particular embodiments disclosed above may be altered or modified and all such variations are considered within the scope and spirit of the claimed invention. Accordingly, the protection sought herein is as set forth in the claims below.

What is claimed:

1. A method, comprising:
   storing at least one atomic instruction in a queue in response to the atomic instruction being retired;
   identifying a target memory location associated with load and store portions of the atomic instruction;
   acquiring a line of memory associated with the target memory location, and storing the line of acquired memory in a cache; and
   if the line of acquired memory has been evicted, permitting the evicted line of memory to be re-acquired in response to the atomic instruction being ready to write data in the queue and permitting the evicted line of memory to be re-acquired a predetermined limited number of times before the atomic instruction becomes the oldest instruction stored in the queue.

2. A method, as set forth in claim 1, wherein permitting the evicted line of memory to be re-acquired in response to the atomic instruction being ready to write data in the queue further comprises permitting the evicted line of memory to be re-acquired in response to the atomic instruction becoming the oldest instruction stored in the queue.

3. A method, as set forth in claim 1, wherein permitting the evicted line of memory to be re-acquired a predetermined limited number of times before the atomic instruction becomes the oldest instruction stored in the queue further comprises permitting the line of memory to be re-acquired two times before the atomic instruction becomes the oldest instruction stored in the queue.

4. A method, as set forth in claim 1, further comprising preventing the evicted line of memory from being re-acquired before the atomic instruction becomes the oldest instruction stored in the queue.

5. A method, as set forth in claim 4, wherein preventing the evicted line of memory from being re-acquired until the atomic instruction becomes the oldest instruction stored in the queue further comprises preventing the evicted line of memory from being re-acquired more than a predetermined limited number of times before the atomic instruction becomes the oldest instruction stored in the queue.

6. A method, as set forth in claim 5, wherein preventing the evicted line of memory from being re-acquired more than a predetermined limited number of times until the atomic instruction becomes the oldest instruction stored in the queue further comprises preventing the evicted line of memory from being re-acquired more than two times before the atomic instruction becomes the oldest instruction stored in the queue.

7. An apparatus, comprising:
  a queue adapted for storing at least one atomic instruction in response to the atomic instruction being retired, a target memory location being associated with load and store portions of the atomic instruction; and
  a cache adapted for acquiring a line of memory associated with the target memory location, storing the line of acquired memory in the cache, and if the line of acquired memory has been evicted, re-acquiring the line of memory in response to the atomic instruction being ready to write data to the cache, and re-acquiring the evicted line of memory a predetermined limited number of times before the atomic instruction becomes the oldest instruction stored in the queue.

8. An apparatus, as set forth in claim 7, further comprising the cache re-acquiring the evicted line of memory in response to the atomic instruction becoming the oldest instruction stored in the queue.

9. An apparatus, as set forth in claim 7, wherein the cache re-acquires the evicted line of memory no more than two times prior to the atomic instruction becoming the oldest instruction stored in the queue.

10. An apparatus, as set forth in claim 7, further comprising the cache being adapted to prevent the evicted line of memory from being re-acquired before the atomic instruction becomes the oldest instruction stored in the queue.

11. An apparatus, as set forth in claim 10, further comprising the cache being adapted to prevent the evicted line of memory from being re-acquired more than a predetermined limited number of times before the atomic instruction becomes the oldest instruction stored in the queue.

12. An apparatus, as set forth in claim 11, further comprising the cache being adapted to prevent the evicted line of memory from being re-acquired more than two times before the atomic instruction becomes the oldest instruction stored in the queue.

13. A non-transitory computer readable program storage device encoded with at least one instruction that, when executed by a computer, performs a method, comprising:
  storing at least one atomic instruction in a queue in response to the atomic instruction being retired;
  identifying a target memory location associated with load and store portions of the atomic instruction;
  acquiring a line of memory associated with the target memory location, and storing the line of acquired memory in a cache; and
  if the line of acquired memory has been evicted, permitting the evicted line of memory to be re-acquired in response to the atomic instruction being ready to write data to the cache and permitting the evicted line of memory to be re-acquired a predetermined limited number of times before the atomic instruction becomes the oldest instruction stored in the queue.

14. A non-transitory computer readable program storage device, as set forth in claim 13, further comprising the cache re-acquiring the evicted line of memory in response to the atomic instruction becoming the oldest instruction stored in the queue.

15. A non-transitory computer readable program storage device, as set forth in claim 14, wherein permitting the evicted line of memory to be re-acquired a predetermined limited number of times before the atomic instruction becomes the oldest instruction stored in the queue further comprises permitting the line of memory to be re-acquired two times before the atomic instruction becomes the oldest instruction stored in the queue.

16. A non-transitory computer readable program storage device, as set forth in claim 13, further comprising preventing the evicted line of memory from being re-acquired before the atomic instruction becomes the oldest instruction stored in the queue.

17. A on-transitory computer readable program storage device, as set forth in claim 16, wherein preventing the evicted line of memory from being re-acquired until the atomic instruction becomes the oldest instruction stored in the queue further comprises preventing the evicted line of memory from being re-acquired more than a predetermined limited number of times before the atomic instruction becomes the oldest instruction stored in the queue.

18. A non-transitory computer readable program storage device, as set forth in claim 17, wherein preventing the evicted line of memory from being re-acquired more than a predetermined limited number of times until the atomic instruction becomes the oldest instruction stored in the queue further comprises preventing the evicted line of memory from being re-acquired more than two times before the atomic instruction becomes the oldest instruction stored in the queue.

19. A non-transitory computer readable storage device encoded with data that, when implemented in a manufacturing facility, adapts the manufacturing facility to create an apparatus, comprising:
  a queue adapted for storing at least one atomic instruction in response to the atomic instruction being retired, a target memory location being associated with load and store portions of the atomic instruction; and
  a cache adapted for acquiring a line of memory associated with the target memory location, storing the line of acquired memory in the cache, and if the line of acquired memory has been evicted, re-acquiring the line of memory in response to the atomic instruction being ready to write data to the cache and re-acquiring the evicted line of memory a predetermined limited number of times before the atomic instruction becomes the oldest instruction stored in the queue.

20. A non-transitory computer readable storage device encoded with data that, when implemented in a manufacturing facility, adapts the manufacturing facility to create an apparatus, as set forth in claim 19, further comprising the cache re-acquiring the evicted line of memory in response to the atomic instruction becoming the oldest instruction stored in the queue.

21. A non-transitory computer readable storage device encoded with data that, when implemented in a manufacturing facility, adapts the manufacturing facility to create an apparatus, as set forth in claim 19, wherein the cache re-acquires the evicted line of memory no more than two times prior to the atomic instruction becoming the oldest instruction stored in the queue.

22. A non-transitory computer readable storage device encoded with data that, when implemented in a manufacturing facility, adapts the manufacturing facility to create an apparatus, as set forth in claim 19, further comprising the cache being adapted to prevent the evicted line of memory from being re-acquired before the atomic instruction becomes the oldest instruction stored in the queue.

23. A non-transitory computer readable storage device encoded with data that, when implemented in a manufacturing facility, adapts the manufacturing facility to create an apparatus, as set forth in claim 22, further comprising the cache being adapted to prevent the evicted line of memory from being re-acquired more than a predetermined limited number of times before the atomic instruction becomes the oldest instruction stored in the queue.

24. A non-transitory computer readable storage device encoded with data that, when implemented in a manufacturing facility, adapts the manufacturing facility to create an apparatus, as set forth in claim 23, further comprising the cache being adapted to prevent the evicted line of memory from being re-acquired more than two times before the atomic instruction becomes the oldest instruction stored in the queue.

25. A method, comprising:
  acquiring a line of memory associated with a target memory location for an instruction in a queue, and storing the line of acquired memory in a cache; and
  if the line of acquired memory has been evicted, preventing the evicted line of memory from being re-acquired until the instruction is the oldest instruction in the queue unless the evicted line of memory has been re-acquired less than a predetermined number of times.

26. The method of claim 25, comprising permitting the evicted line of memory to be re-acquired if the instruction is the oldest instruction in the queue.

27. The method of claim 25, comprising permitting the evicted line of memory to be re-acquired if the evicted line of memory has been re-acquired less than the predetermined number of times.

28. The method of claim 27, wherein the predetermined number of times is two.

29. The method of claim 25, comprising incrementing a value of a counter associated with the evicted line of memory in response to re-acquisition of the evicted line of memory and determining whether the evicted line of memory has been re-acquired less than the predetermined number of times using the value of the counter.

* * * * *

UNITED STATES PATENT AND TRADEMARK OFFICE
CERTIFICATE OF CORRECTION

| | | |
|---|---|---|
| PATENT NO. | : 8,713,259 B2 | Page 1 of 1 |
| APPLICATION NO. | : 12/948562 | |
| DATED | : April 29, 2014 | |
| INVENTOR(S) | : Christopher D. Bryant | |

It is certified that error appears in the above-identified patent and that said Letters Patent is hereby corrected as shown below:

In the Claims:

Column 12, Line 12, please change "A on-transitory computer readable program storage device" to --A non-transitory computer readable program storage device--

Signed and Sealed this
Nineteenth Day of August, 2014

Michelle K. Lee
*Deputy Director of the United States Patent and Trademark Office*